US012789310B2

(12) United States Patent
Abbott et al.

(10) Patent No.: US 12,789,310 B2
(45) Date of Patent: Nov. 10, 2026

(54) POWER TOOL INCLUDING FALL DETECTION AND AUTOSTOP

(71) Applicant: MILWAUKEE ELECTRIC TOOL CORPORATION, Brookfield, WI (US)

(72) Inventors: Jonathan E. Abbott, Milwaukee, WI (US); Hannah E. Phipps, Greenwood, IN (US); Carter H. Ypma, Milwaukee, WI (US); Daniel E. Endean, Hartland, WI (US); Nicholas J. LePar, West Allis, WI (US); Grace Whitmore, Palatine, IL (US); Niladri Basu Bal, Chicago, IL (US); Arhum M. Zafar, Brooklyn, NY (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/936,098

(22) Filed: Nov. 4, 2024

(65) Prior Publication Data

US 2025/0121469 A1 Apr. 17, 2025

Related U.S. Application Data

(63) Continuation of application No. 18/173,968, filed on Feb. 24, 2023, now Pat. No. 12,134,155.

(Continued)

(51) Int. Cl.
*B23Q 11/00* (2006.01)

(52) U.S. Cl.
CPC ...... *B23Q 11/0092* (2013.01); *B23Q 2717/00* (2013.01)

(58) Field of Classification Search
CPC .... B23Q 5/28; B23Q 7/0909; B23Q 11/0092; B23Q 2717/00
See application file for complete search history.

(56) References Cited

U.S. PATENT DOCUMENTS 5,601,483 A 2/1997 Rudolf et al.
7,075,195 B2 * 7/2006 Feil ........................ H02H 11/00 307/142

(Continued)

FOREIGN PATENT DOCUMENTS

DE 102011007403 A1 10/2012
DE 102018214811 A1 3/2020

(Continued)

OTHER PUBLICATIONS

ToolGuyd, "Robbox xDrill—a Smart Cordless Drill "of the Future"," available at <https://toolguyd.com/robbox-xdrill-smart-cordless-drill/> article dated Jul. 27, 2020 (41 pages).

*Primary Examiner* — Joshua G Kotis
*Assistant Examiner* — David G Shutty
(74) *Attorney, Agent, or Firm* — Michael Best & Friedrich LLP

(57) ABSTRACT

A power tool including a motor configured to produce an output, and a sensor configured to measure an acceleration of the power tool along at least one of three spatial axes and generate an output signal related to the acceleration. The power tool further including a controller configured to receive the output signal related to the acceleration of the power tool from the sensor, compare the acceleration of the power tool to a free-fall acceleration threshold, initiate a timer when the acceleration of the power tool corresponds to the free-fall acceleration threshold, compare the timer to a free-fall timer threshold, and stop the motor from producing the output when the timer is greater than or equal to the free-fall timer threshold.

17 Claims, 11 Drawing Sheets

Related U.S. Application Data

(60) Provisional application No. 63/314,522, filed on Feb. 28, 2022.

(56) References Cited

U.S. PATENT DOCUMENTS

| | | | | |
|---|---|---|---|---|
| 7,253,541 | B2 | 8/2007 | Kovarik et al. | |
| 7,282,818 | B2 | 10/2007 | Kovarik | |
| 7,344,435 | B2 | 3/2008 | Pollak et al. | |
| 8,316,547 | B2 * | 11/2012 | Hecht | F16P 3/00 30/166.3 |
| 8,330,305 | B2 * | 12/2012 | Hart | H04M 1/185 361/679.02 |
| 8,903,519 | B2 * | 12/2014 | King | H04M 1/185 700/79 |
| 8,960,688 | B2 | 2/2015 | Zhou | |
| 9,342,108 | B2 * | 5/2016 | Rothkopf | H04M 1/185 |
| 9,998,893 | B2 * | 6/2018 | Esenwein | G08B 21/043 |
| 10,099,341 | B2 | 10/2018 | Aoki | |
| 10,625,386 | B2 * | 4/2020 | Nozakura | G01P 15/0802 |
| 10,630,223 | B2 | 4/2020 | Yamaguchi et al. | |
| 11,099,204 | B2 * | 8/2021 | Proano | A61B 6/102 |
| 11,128,114 | B2 * | 9/2021 | Kralik | F21L 4/005 |
| 11,303,744 | B1 * | 4/2022 | Marc | H04M 1/72412 |
| 11,446,747 | B2 * | 9/2022 | Vetter | B23B 45/003 |
| 11,740,146 | B2 * | 8/2023 | Goyal | G01R 31/385 73/12.06 |
| 11,826,901 | B2 * | 11/2023 | Son | G06F 11/3058 |
| 12,151,331 | B2 * | 11/2024 | Wiker | B23Q 17/00 |
| 12,212,179 | B2 * | 1/2025 | Goyal | G01P 15/18 |
| 12,235,192 | B2 * | 2/2025 | Goel | G06Q 10/04 |
| 2008/0174444 | A1 * | 7/2008 | Noda | G01P 15/08 340/669 |
| 2012/0279742 | A1 * | 11/2012 | Roser | B25F 5/00 173/176 |
| 2013/0109375 | A1 * | 5/2013 | Zeiler | G01S 19/16 455/552.1 |
| 2014/0166323 | A1 * | 6/2014 | Cooper | F16P 3/147 173/176 |
| 2014/0240125 | A1 * | 8/2014 | Burch | B25H 3/02 340/539.13 |
| 2015/0382085 | A1 * | 12/2015 | Lawrie-Fussey | G06F 1/3287 340/870.07 |
| 2016/0218555 | A1 * | 7/2016 | Slaby | H02J 7/34 |
| 2016/0220153 | A1 * | 8/2016 | Annegarn | A61B 5/7275 |
| 2017/0008159 | A1 * | 1/2017 | Boeck | G05B 19/00 |
| 2017/0180536 | A1 * | 6/2017 | Stock | H04W 4/80 |
| 2018/0054502 | A1 * | 2/2018 | Wilson | H04M 1/185 |
| 2019/0013762 | A1 * | 1/2019 | Yamaguchi | H02P 29/0022 |
| 2019/0227528 | A1 * | 7/2019 | Abbott | G05B 13/027 |
| 2020/0044209 | A1 * | 2/2020 | Huggins | H02J 7/0048 |
| 2020/0133229 | A1 * | 4/2020 | Girt | B25F 5/00 |
| 2020/0203986 | A1 | 6/2020 | Barreau et al. | |
| 2021/0209920 | A1 | 7/2021 | Donger | |
| 2022/0303660 | A1 * | 9/2022 | Nagar | G01P 15/0891 |
| 2023/0135298 | A1 * | 5/2023 | Goyal | H02J 7/007188 429/61 |
| 2023/0158658 | A1 | 5/2023 | Ghouse et al. | |
| 2024/0402212 | A1 * | 12/2024 | Cauthen | G01P 15/00 |

FOREIGN PATENT DOCUMENTS

| | | | |
|---|---|---|---|
| DE | 102020207520 | A1 | 3/2021 |
| EP | 2656977 | B1 | 1/2019 |
| WO | 2010067789 | A1 | 6/2010 |
| WO | 2013072201 | A2 | 5/2013 |
| WO | 2017140537 | A1 | 8/2017 |
| WO | 2018177932 | A1 | 10/2018 |
| WO | 2019057639 | A1 | 3/2019 |
| WO | 2019137818 | A1 | 7/2019 |
| WO | 2020260069 | A1 | 12/2020 |
| WO | 2020260079 | A1 | 12/2020 |

* cited by examiner

POWER TOOL INCLUDING FALL DETECTION AND AUTOSTOP

RELATED APPLICATIONS

This application is a continuation of U.S. patent application Ser. No. 18/173,968, filed Feb. 24, 2023, which claims the benefit of U.S. Provisional Patent Application No. 63/314,522, filed Feb. 28, 2022, the entire content of each of which is hereby incorporated by reference.

FIELD

Embodiments described herein relate to battery pack powered power tools and power tool devices.

SUMMARY

Embodiments described herein provide systems and methods to detect a power tool in free-fall. While in use, a power tool may experience a variety of events that could cause an operator to drop the power tool (e.g., kickback from a workpiece, operator error, a fall while not operational or not recently operational [e.g., fall off a ladder], etc.). For the safety of the operator and the environment, it would be advantageous to brake the motor once a free-fall of the power tool is determined. This would allow the power tool to stop the motor and have no surrounding danger from the power tool besides the initial drop. However, a false positive free-fall determination may cause a premature stopping of the motor, forcing an operator to restart a task on a workpiece. Through having a plurality of thresholds and subsequent control methods, the method of fall detection and autostop disclosed below avoids the motor of a power tool being stopped prematurely, while further including a plurality of predetermined thresholds to determine when the power tool has been dropped.

Power tools described herein include a motor configured to produce an output, a sensor configured to measure an acceleration of the power tool and generate an output signal related to the acceleration, and a controller electrically connected to the motor and the sensor. The controller is configured to receive the output signal related to the acceleration of the power tool from the sensor and compare the acceleration of the power tool to a free-fall acceleration threshold. The controller is also configured to initiate a timer when the acceleration of the power tool satisfies the free-fall acceleration threshold and compare the timer to a free-fall timer threshold. The controller is further configured to stop the motor from producing the output when the timer is greater than or equal to the free-fall timer threshold.

Methods described herein for drop detection of a power tool include generating, using a sensor configured to measure an acceleration of the power tool, an output signal related to the acceleration and receiving, using a controller of the power tool, the output signal related to the acceleration of the power tool from the sensor. The methods also include comparing, using the controller, the acceleration of the power tool to a free-fall acceleration threshold and initiating, using the controller, a timer when the acceleration of the power tool satisfies the free-fall acceleration threshold. The methods further include comparing, using the controller, the timer to a free-fall timer threshold and stopping, using the controller, a motor of the power tool from producing an output when the timer is greater than or equal to the free-fall timer threshold.

Power tool device systems described herein include a power tool device connected to a smart lanyard, a sensor configured to measure an acceleration of the power tool device and generate an output signal related to the acceleration of the power tool device, and a controller electrically connected to the sensor. The controller is configured to receive the output signal related to the acceleration of the power tool device from the sensor, and compare the acceleration of the power tool device to a free-fall acceleration threshold. The controller is also configured to initiate a timer when the acceleration of the power tool device satisfies the free-fall acceleration threshold, and compare the timer to a free-fall timer threshold. The controller is further configured to provide an indication of free fall to the smart lanyard when the timer is greater than or equal to the free-fall timer threshold, wherein the smart lanyard system is configured to perform a protective action in response to receiving the indication.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
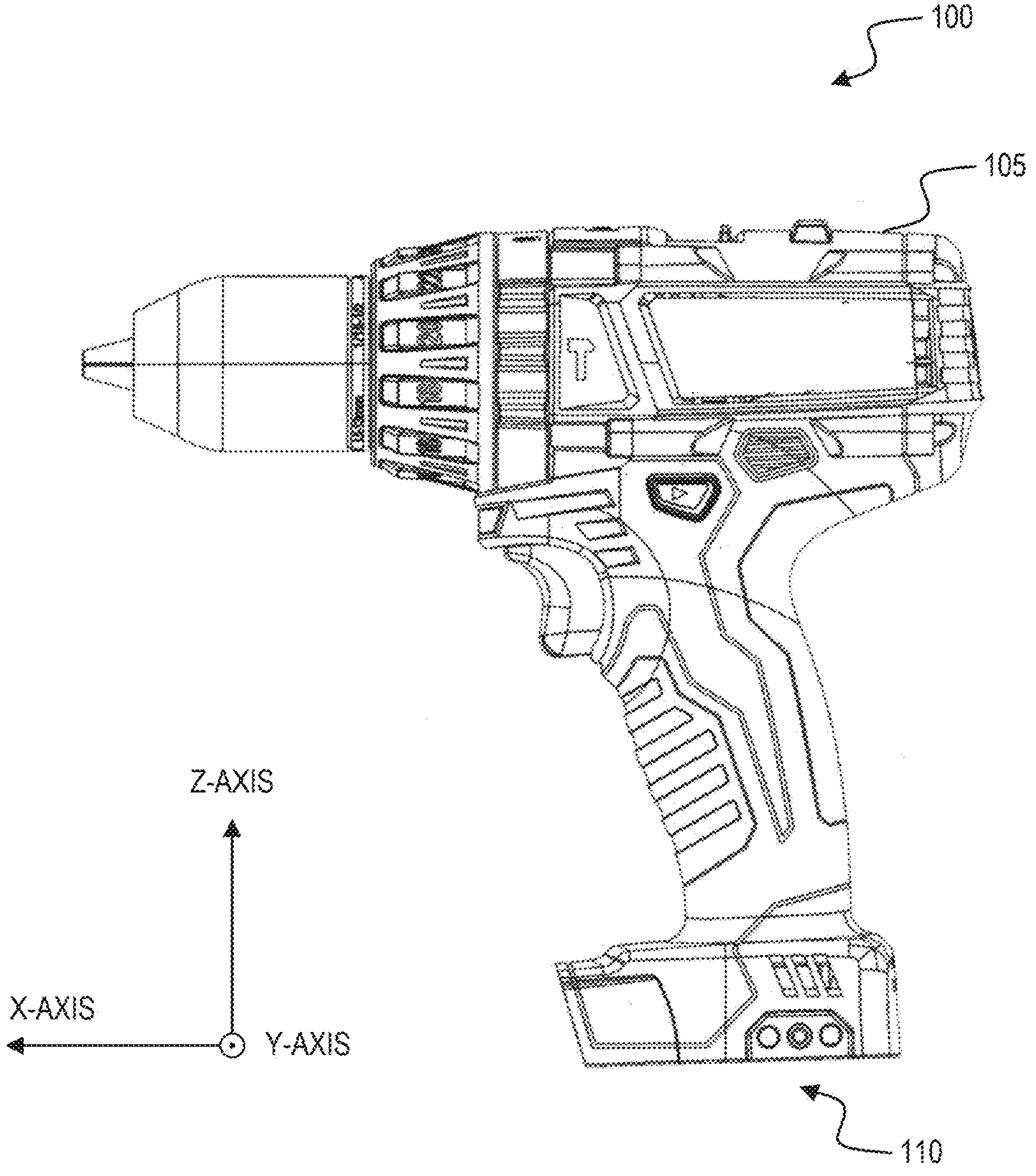
FIG. 1 illustrates a device according to embodiments described herein.

FIG. 1 illustrates a device 100 that includes a housing 105 and a controller within the housing. In the embodiment illustrated in FIG. 1, the device is a power tool (e.g., a hand drill). In other embodiments, the device 100 is a different type of power tool (e.g., a rotary tool, rotary hammer, router, impact wrench, impact driver, saw, etc.). In some embodiments, the device 100 is a power tool device other than a power tool, such as a power tool battery pack, a battery pack charger, an insertable communication module, a power tool adapter, etc. The device 100 includes an interface 110 to attach a battery pack. In some embodiments, the interface 110 is configured to attach a 18V battery. In other embodiments, the interface 110 is configured to attach a 12V battery. In other embodiments, the interface 110 is configured to attach another amount of voltage battery. The battery pack is coupled to the device 100 and provides power to the device 100 to drive a motor (see FIG. 2). The motor is operable to drive a tool element to perform a desired operation (e.g., screw a fastener, etc.).

Figure 2:
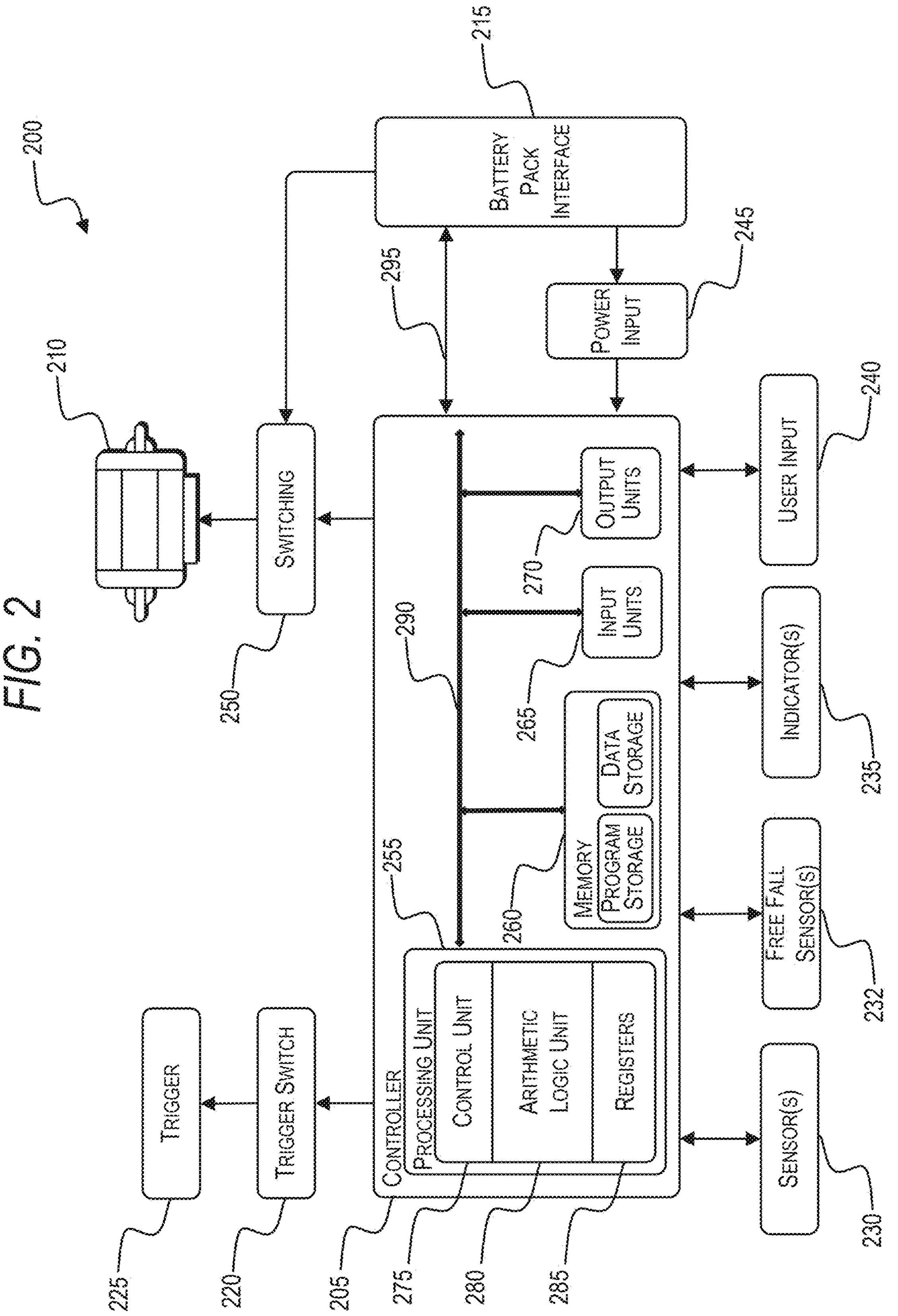
FIG. 2 illustrates a control system for the device of FIG. 1 according to embodiments described herein.

FIG. 2 illustrates a control system 200 for the device 100 that determines when the device 100 has been dropped. The control system 200 includes a controller 205. The controller 205 is electrically and/or communicatively connected to a variety of modules or components of the device 100. For example, the illustrated controller 205 is electrically connected to a motor 210, a battery pack interface 215, a trigger switch 220 (connected to a trigger 225), one or more sensors or sensing circuits 230, one or more free-fall sensors 232, one or more indicators 235, a user input module 240, a power input module 245, and a switching module 250 (e.g., including a plurality of switching FETs). In some embodiments, the at least one sensor or sensing circuit is mounted to a printed circuit board which is within the housing 105 (e.g., a handle). In some embodiments, the at least one free-fall sensor 232 is mounted to a printed circuit board within the housing (e.g., a handle). In some embodiments, the free-fall sensor 232 includes a variety of motion detecting sensors (e.g., a gyroscope, an accelerometer, an inertial measurement unit ["IMU" ], etc.) to allow a free-fall of the tool to be detected. In some embodiments, the device 100 includes the IMU for detection for free-fall to use as an interrupt for wake-up.

The control system 200 includes combinations of hardware and software that are operable to, among other things, control the operation of the device 100, monitor the operation of the device 100, activate the one or more indicators 235 (e.g., an LED), etc.

The controller 205 includes a plurality of electrical and electronic components that provide power, operational control, and protection to the components and modules within the controller 205 and/or the device 100. For example, the controller 205 includes, among other things, a processing unit 255 (e.g., a microprocessor, a microcontroller, an electronic processor, an electronic controller, or another suitable programmable device), a memory 260, input units 265, and output units 270. The processing unit 255 includes, among other things, a control unit 275, an arithmetic logic unit ("ALU") 280, and a plurality of registers 285 (shown as a group of registers in FIG. 2), and is implemented using a known computer architecture (e.g., a modified Harvard architecture, a von Neumann architecture, etc.). The processing unit 255, the memory 260, the input units 265, and the output units 270, as well as the various modules or circuits connected to the controller 205 are connected by one or more control and/or data buses (e.g., common bus 290). In some embodiments, the memory 260 is configured to store one or more thresholds, parameters, and/or operational characteristics associated with the device 100 for determining when the device 100 is in free-fall (e.g., has been dropped). For example, the memory 260 can store an acceleration threshold, a timer threshold, etc. The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 260 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 255 is connected to the memory 260 and executes software instructions that are capable of being stored in a RAM of the memory 260 (e.g., during execution), a ROM of the memory 260 (e.g., on a generally permanent basis), or another non-transitory computer readable medium such as another memory or a disc. Software included in the implementation of the device 100 can be stored in the memory 260 of the controller 205. The software includes, for example, firmware, one or more applications, program data, filters, open or more program modules, rules for predetermined thresholds of the free-fall sensors 232, and other executable instructions. The controller 205 is configured to retrieve from the memory 260 and execute, among other things, instructions related to the control processes and methods described herein. In other constructions, the control system 200 includes additional, fewer, or different components.

The battery pack interface 215 includes a combination of mechanical components (e.g., rails, grooves, latches, etc.) and electrical components (e.g., one or more terminals) configured to and operable for interfacing (e.g., mechanically, electrically, and communicatively connecting) the device 100 with a battery pack. For example, power provided by the battery pack is provided to the power input module 245. The power input module 245 includes combinations of active and passive components to regulate or control the power received from the battery pack prior to power being provided to the controller 205. The battery pack interface 215 also supplies power to the switching module 250 to provide power to the motor 210. The battery pack interface 215 also includes, for example, a communication line 295 for providing a communication line or link between the controller 205 and the battery pack.

The indicators 235 include, for example, one or more light-emitting diodes ("LEDs"). The indicators 235 can be configured to display conditions of, or information associated with, the device 100. For example, the indicators 235 are configured to indicate measured electrical characteristics of the device 100, the status of the device 100, etc. The user input module 240 is operably coupled to the controller 205 to, for example, select a forward mode of operation or a reverse mode of operation, a torque and/or speed setting for the device 100 (e.g., using torque and/or speed switches), etc. In some embodiments, the user input module 240 includes a combination of digital and analog input or output devices required to achieve a desired level of operation for the device 100, such as one or more knobs, one or more dials, one or more switches, one or more buttons, etc.

The controller 205 is configured to determine whether a fault condition of the device 100 is present and generate one or more control signals related to the fault condition. For example, the sensing circuits 230 include one or more current sensors, one or more speed sensors, one or more Hall Effect sensors, a gyroscope, an accelerometer, and inertial measurement unit ("IMU"), etc. The controller 205 calculates or includes, within memory 260, predetermined operational threshold values and limits for operation of the device 100. For example, when a potential thermal failure (e.g., of a FET, the motor 210, etc.) is detected or predicted by the controller 205, power to the motor 210 can be limited or interrupted until the potential for thermal failure is reduced. In another example, the controller 205 determines or includes, within the memory 260, predetermined threshold values for the free-fall sensors 232 to determine whether the device 100 is in free-fall. When the controller 205 detects one or more such fault conditions of the device 100 or determines that a fault condition of the device 100 no longer exists, the controller 205 is configured to provide information and/or control signals to another component of the device 100 (e.g., the battery pack interface 215, the indicators 235, the switching module 250, etc.).

Figure 3:
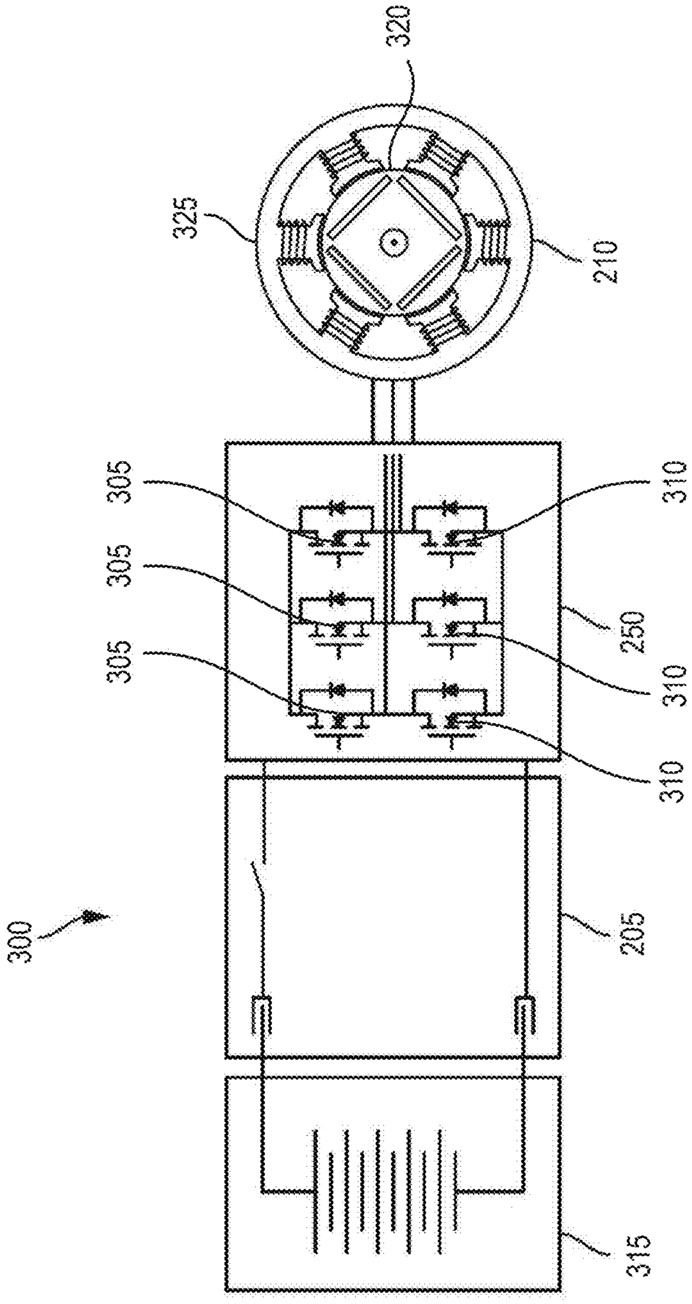
FIG. 3 illustrates a circuit diagram for a switching module according to embodiments described herein.

FIG. 3 illustrates a circuit diagram 300 of the switching module 250. The switching module 250 includes a number of power switching elements 305, 310 (e.g., FETs). The controller 205 provides the control signals to control the FETs 305 and the FETs 310 to drive the motor 210 based on motor feedback information and user controls. For example, in response to detecting a pull of the trigger 225, the controller 205 provides the control signals to selectively enable and disable the FETs 305 and 310 (e.g., sequentially, in pairs) resulting in power from the power source 315 (e.g., battery pack) to be selectively applied to stator coils of the motor 210 to cause rotation of a rotor 320 relative to a stator 325. In some embodiments, the control signals include pulse width modulated (PWM) signals having a duty cycle that is set in proportion to the amount of trigger pull of the trigger 225, to thereby control the speed or torque of the motor 210.

In some embodiments, to drive the motor 210, the controller 205 enables a first FET pair 305 and 310 (e.g., by providing a voltage at a gate terminal of the FETs) for a first period of time. In response to determining that the rotor of the motor 210 has rotated based on a pulse from the sensing circuits 330, the controller 205 disables the first FET pair 305 and 310, and enables a second FET pair 305 and 310. In response to determining that the rotor of the motor 210 has rotated based on pulse(s) from the sensing circuits 330, the controller 205 disables the second FET pair 305 and 310, and enables a third FET pair 305 and 310. This sequence of cyclically enabling pairs of FET 305 and FET 310 repeats to drive the motor 210.

When the controller 205 receives a signal to shut down the device 100, the controller 205 stops the motor 210. For example, the FETs 310 are enabled and coincidingly shunt the motor's coils to the ground. In other embodiments, a coast and brake method is implemented. After the release of the trigger or turning off of a switch, the motor 210's voltage decays. Once the voltage decays to a predetermined voltage value, a brake (e.g., a hard brake) is applied to the motor. The FETs 310 are then enabled and, again, will shunt the motor's 210 coils to the ground. In some embodiments, a brake may be applied to the motor by disconnecting the power being sent to the motor 210. In some embodiments, the power is halted though a power switch being opened. In some embodiments, the power is halted through a solid-state disconnect ("SSD"). In some embodiments, with power removed from the motor 210, the controller 205 turns on at least one separate brake resistance or resistor via at least one switch (e.g., a FET) in order to dissipate energy from the motor 210.

Figure 4:
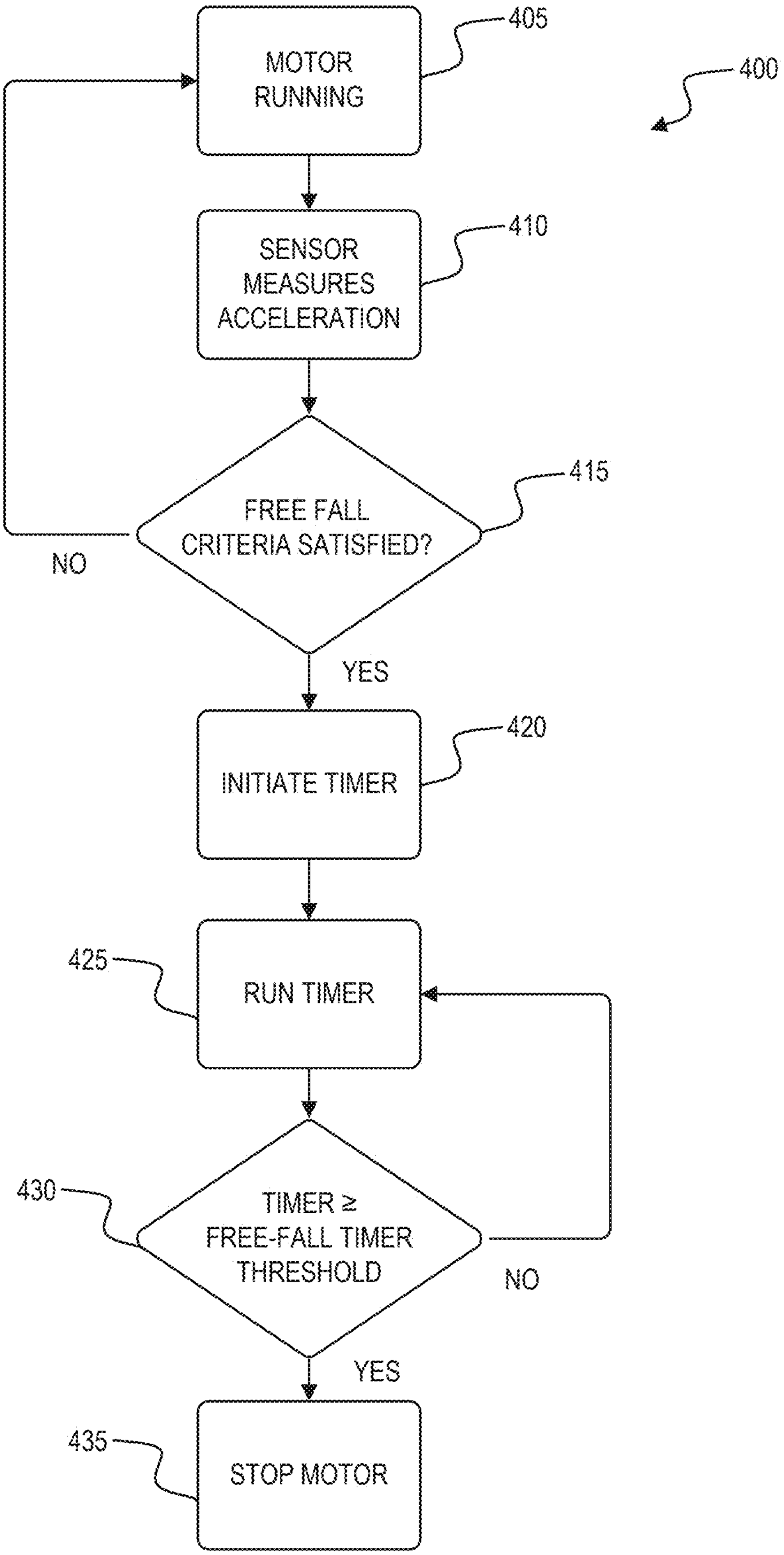
FIG. 4 illustrates a process for detecting free-fall according to embodiments described herein.

FIG. 4 illustrates a method 400 executed by the controller 205 for controlling the device 100 based on drop detection of the device 100. The device 100 is operated by a user pulling the power switch (e.g., trigger 225) to an ON condition to initiate operation of the motor 210. The device 100 includes the free-fall sensor 232 for detecting the drop condition of the device 100. In some embodiments, the free-fall sensor 232 includes an accelerometer, an IMU, and/or a gyroscope.

The method 400 begins with initiating the motor 210 (STEP 405) for normal operation. In some embodiments, the motor 210 is initiated using a power switch (e.g., trigger 225) being turned to an ON condition. The free-fall sensor 232 measures, for example, an acceleration of the device 100 (STEP 410) along the X, Y, and/or Z axes of the device 100 (see FIG. 1). In some embodiments, once the device 100 is dropped, the acceleration value along the X, Y, or Z axis is changed. In other embodiments, once the device 100 is dropped, the acceleration value in a combination of the X, Y, and Z axes are changed. In some embodiments, a composite acceleration vector is created based on the acceleration values measured along each of the X, Y, and Z axes. An acceleration value corresponding to a free-fall condition can then be used to determine whether or not the device 100 is in free-fall using a free-fall acceleration threshold (e.g., stored in the memory 260). In other embodiments, an accelerometer includes a free-fall detection and directly outputs a signal (e.g., a digital signal, analog signal, etc.) to indicate the likely presence of free fall. In other embodiments, an accelerometer triggers an interrupt based on the accelerometer suspecting the presence of a free fall. The device 100 monitors the signals from the accelerometer (i.e., monitoring whether a free fall signal remains active). The device 100 further monitors raw acceleration values (e.g., to compute a more robust free fall detection using the raw acceleration values). The acceleration values may take multiple forms that may or may not be a pure acceleration. In some embodiments, the acceleration value (integer X) is $|X|$. In other examples, the acceleration value is $x^2$, $|X+Y+Z|$, $|X|+|Y|+|Z|$, $X^2+Y^2+Z^2$, or $\sqrt{X^2+Y^2+Z^2}$. In other embodiments, other formulas (i.e., tabular, non-linear transformations, etc.) are also used. In yet another embodiment, filters (e.g., low pass filters) of the acceleration are used.

In some embodiments, the free-fall sensor 232 includes a gyroscope. The gyroscope measures angular motion (e.g., angular velocity) of the device 100, and detects whether the device 100 is moving at an undesirable angular velocity for continued operation. The angular velocity value measured by the gyroscope may be used to determine whether the device is in free-fall through implementation of an angular velocity threshold (e.g., stored in the memory 260).

The method 400 includes comparing a measured acceleration (or angular velocity) to free fall criteria (e.g., a predetermined free-fall acceleration threshold) (STEP 415). When the free fall criteria continues to not be met, the motor 210 of the device 100 remains in operation (STEP 405). The accelerometer will measure an acceleration value of zero or substantially close to zero when the device 100 is in free fall. Therefore, the predetermined free-fall acceleration threshold has a value of zero or a number close to zero (e.g., 1.0 $m/s^2$). When, at STEP 415, the acceleration values detected from the sensor reaches or falls below the predetermined free-fall acceleration threshold, the free fall criteria are satisfied and the method 400 will then proceed to STEP 420. At STEP 420, a timer will then be initiated by the controller 205. The timer will run continuously (STEP 425) as long as the free fall criteria is met. The controller determines whether the timer exceeds a free-fall timer threshold (at STEP 430). The controller 205 compares the timer to the free-fall timer threshold to determine whether the device 100 has been falling for a predetermined amount of time. For example, the timer is used to ensure that the device 100 hasn't been merely moved in a way to correspond to the predetermined free-fall acceleration threshold by some mistake or operator error without a need for the controller 205 to execute a protective action. Instead, the device 100 would only experience a transient instance of the acceleration corresponding to a free-fall acceleration. Once the acceleration no longer corresponds to a free-fall acceleration, the controller 205 would stop the timer before the timer would reach the free-fall timer threshold. Using both a predetermined free-fall acceleration threshold and a free-fall timer threshold allows the controller 205 to distinguish between a free-fall and an otherwise normal device 100 movement. In other embodiments, the device 100 reverses the timer when the free-fall criteria is not met. In some embodiments, the fall of the device 100 may not have a similar rate as an increment of a typical fall. This would allow that when the device 100 hits an object during the duration of the fall and continues falling, the device 100 still determines that a fall has occurred.

When, at STEP 430, the timer equals or exceeds the free-fall timer threshold, the controller 205 stops the motor (STEP 435). For example, the controller 205 brakes the motor during the device's 100 free-fall. By stopping the motor 210, the controller 205 takes preventative measures to cease device 100 operation prior to the device 100 hitting the floor or a different workspace.

Through these sets of predetermined thresholds, the controller 205 differentiates normal device movements from a free-fall of the device 100, allowing continued operation and negating any premature stopping of the motor 210.

In some embodiments, the controller 205 is configured to determine a plurality of fall characteristics for the device 100 (e.g., start of fall). For example, a machine learning controller may be implemented within the controller 205 or in conjunction with the controller 205 in the device 100. Examples of machine leaning techniques and other techniques implemented by the machine learning controller and/or the controller 205 include k-nearest neighbors (KNNs), linear support vector machines (SVM), logistic regression, decision tree, convolutional neural networks (CNNs), deep neural network (DNNs), recurrent neural networks (RNNs), and Attention Networks of data, such as raw sensor data, filtered data, processed data (i.e., comparative, scaled, converted to a different domain, such as frequency), segments (dilation) of sensor data, features of sensor data (i.e., counters, absolute thresholds, combining sensors), denoised operations and/or trajectory or dead reckoning methods (i.e., with Kalman filters), anomaly detection algorithms, summation or accumulator methods, and the like. In other embodiments, sensor data may be extracted from a one or multi-axis accelerometer. In other embodiments, sensor data may be extracted from a gyrometer or a magnetometer. Sensor data may be compensated or mitigated for DC or scaling bias.

Figure 5:
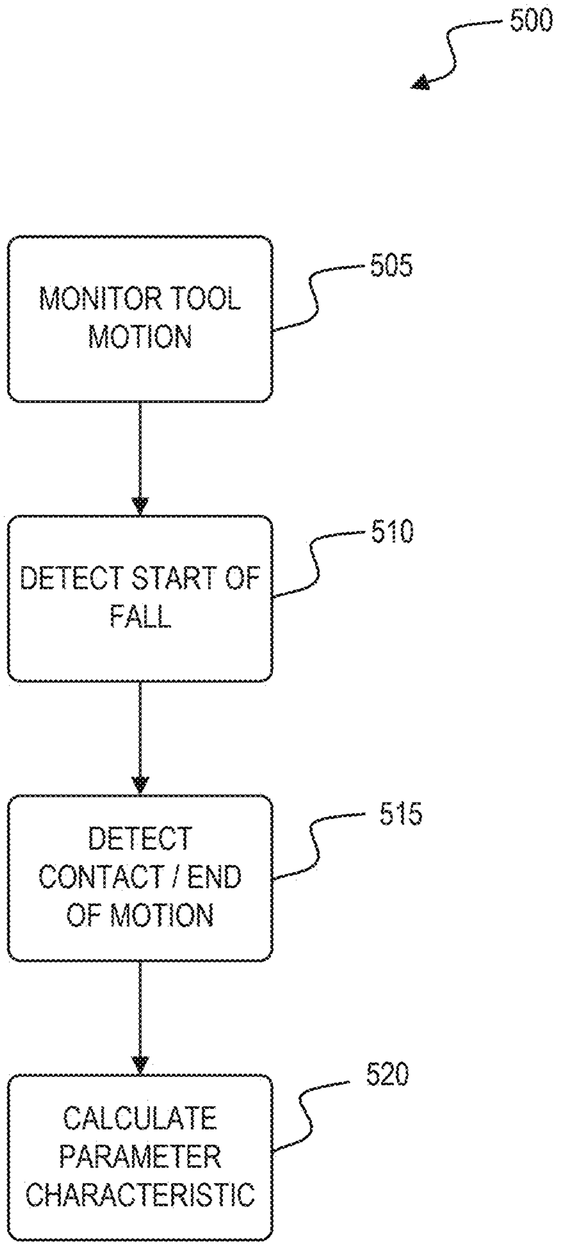
FIG. 5 illustrates a process for calculating a fall parameter characteristic.

FIG. 5 illustrates a method 500 that includes monitoring the motion of the device 100 (STEP 505). The controller 205 detects the beginning of the fall (STEP 510), followed by the controller 205 detecting the end of motion of the device (STEP 515). In some embodiments, controller 205 detects when the device 100 contacts a surface. The distance of the fall (for example, distance of free-fall) may be approximated based on the duration of the fall (for example, duration of free-fall), while also assuming that an initial upward component of velocity is 0 m/s. In other embodiments, dead reckoning techniques are used to estimate initial motion trajectories and better estimate a starting velocity or initial characteristic. In some embodiments, the detection of the beginning of the fall is not specifically ascertained, however, a parameter that roughly relates to distance is still accounted for, for example, based on the duration of the fall. Once the fall is complete, the controller 205 calculates parameter characteristics (for example, drop characteristic). For example, an accumulated method is used to calculate parameter characteristics (for example, a fall duration, fall distance, etc.). At each timestep of the fall, accumulate:

$$\sigma\left(a*\left(b-\sqrt{A_x^2+A_y^2+A_z^2}\right)\right) \quad \text{EQN. 1}$$

where σ is a sigmoid or a similar operator (e.g., a hard sigmoid, step, etc.), a and b are designer selected constants based on the requirements and the sensitivity desired for the system, and Ax, $A_y$, $A_z$ are accelerations measured in the X, Y, and Z axes respectively. Then decrement the accumulation by c or until reaching zero in EQN. 1. The maximum of accumulation or a first accumulated value when reaching a maximum of a second accumulation are useful characteristics. EQN. 1 may be used by choice of parameters to detect a beginning of a fall, contact or end of the fall, or a total characteristic of the fall. Calculating efficient modifications (i.e., using absolute values instead of squaring, skipping the square root, and sigmoid alternatives) are all effective alternatives.

In some embodiments, the device 100 uses hardware circuitry (for example, a hardware component) that accumulates a signal characteristic of a free-fall. For example, a signal on an electrical component (e.g., a capacitor) is produced when a fall is detected. This allows for reducing a computational load on the controller 205. In some embodiments, the controller 205 includes a digital pin for fall detection. The digital pin includes a low pass filter circuit that ascertains characteristics associated with a magnitude of the fall. In some embodiments, circuitry on the device 100 accumulates a voltage to modify additional circuitry (e.g., a flip-flop buffer, a breaker, a braking component, power a light, etc.). The circuitry holds a signal that can be used for a later inspection or evaluation.

Figure 6:
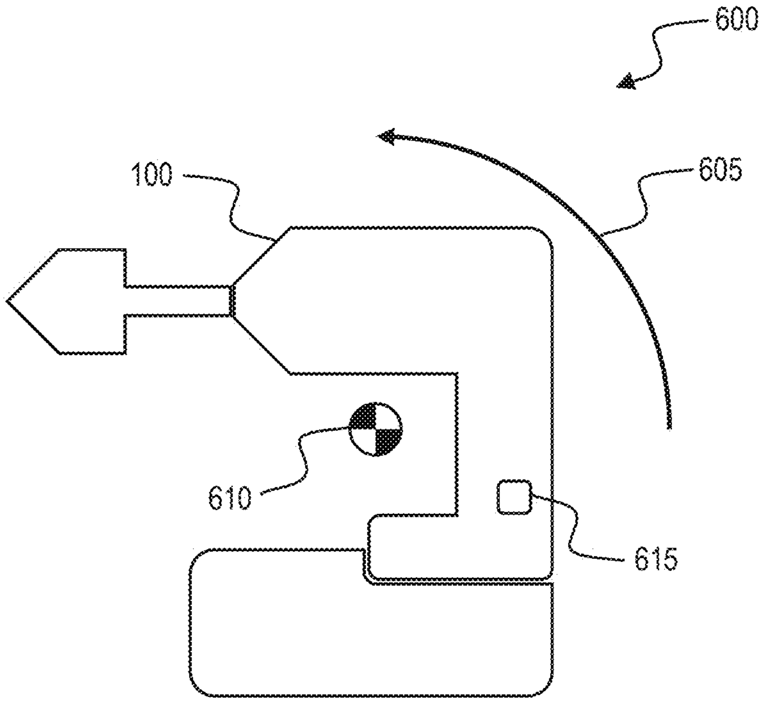
FIG. 6 illustrates a rotation of a power tool.

In some embodiments, the device 100 includes rotation compensation. When a device 100 is dropped, the device 100 may experience rotation in the air while falling (e.g., after a bind-up event or due to the characteristics of release). FIG. 6 illustrates the device 100 in free-fall experiencing device rotation 605. The device 100 includes a motion sensor 615. In some embodiments, the motion sensor 615 is an accelerometer, a gyroscope, and/or an inertial measurement unit (IMU). In some embodiments, the motion sensor 615 is not placed at a center of mass 610 of the device 100. This causes the motion sensor 615 to experience centripetal forces if the device 100 is rotating, which affects fall detection (for example, acceleration). Using information regarding the characteristics of possible attachments (e.g., a power tool with a side handle attachment, a power tool including a large sized battery pack) and configurations (e.g., the type of device being monitored) of the device 100, the motion sensor 615 may compensate for device rotation 605 and/or adjusted center of gravity when detecting acceleration. In some embodiments, the motion sensor 615 is also used to determine the rotation of the device 100. For example, the controller 205 determines that the device 100 is rotating during free fall based on an angular velocity measured by the motion sensor 615 during free fall. In some embodiments, this provides more accurate data to the controller 205 regardless of the type of device 100 or any attachments. In some embodiments, other factors such as known inertial additions to the device 100 (e.g., battery size, presence of a side handle, etc.) is added to account for device 100 acceleration.

In some embodiments, the device 100 includes a machine learning controller, as described above. The machine learning controller is configured to detect a cause of dropping of the device 100. The machine learning controller detects a plurality of characteristics indicative of an event that causes a device 100 to fall. For example, a throwing of the device 100, the device 100 sliding off a table/surface, post bind-up, tipping, an attachment disconnect, etc.

Figure 7:
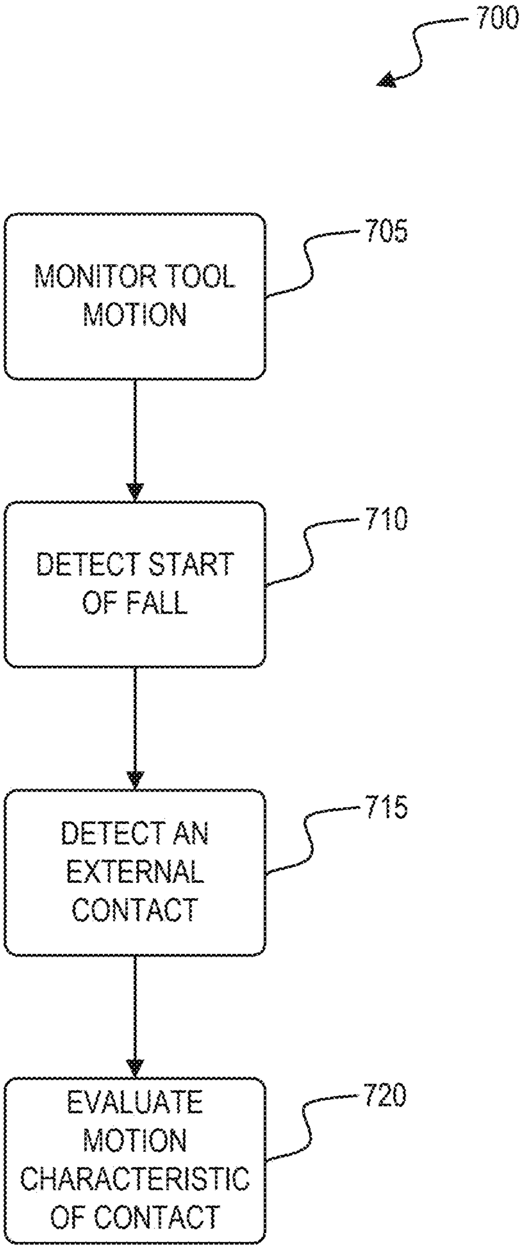
FIG. 7 illustrates a process for evaluating a motion characteristic of a contact.

FIG. 7 illustrates a method 700 for evaluating a characteristic of the motion of the device 100 when contacting a surface. The method 700 begins with the motion of the device 100 being monitored (STEP 705) until the start of a free-fall is detected (STEP 710). The device 100 detects an external contact (STEP 715), indicating that the free-fall has ended, and the device 100 has hit the surface (i.e., the ground, a work surface, etc.). The controller 205 then evaluates a motion characteristic of the contact between the device 100 and the surface (STEP 720). For example, the controller 205 uses parameters such as the magnitude of acceleration, acceleration direction with respect to the tool, duration of slowdown time period, fall profile, rotation, angular impulse, what component of the device 100 contacted the surface, etc. In some embodiments, battery pack and or accessory geometry can also be taken into consideration. In some embodiments, a gyrometer input is used to compensate for angular impulses. In some embodiments, surface hardness is considered with respect to potential severity of damage caused by the fall. In some embodiments, sensor data such as sound (e.g., of a collision), rebound vibrations and trajectory, etc., can also be used to evaluate the characteristic of the contact between the device 100 and the surface. The evaluation of the motion characteristics can be achieved using, for example, the machine learning algorithms described above. In other embodiments, accumulators, truth tables, state machines, and other hard-coded algorithms can be used.

In some embodiments, which portion of the device 100 was contacted/impacted (for example, a portion of impact) during the fall is also determined. Specifically, as noted above, the free-fall sensor 232 may be used to determine the initial orientation of the device 100. During free-fall, the rotation of the device 100 is monitored using the output of a second sensor (e.g., a gyroscope), which may be included as part of the free-fall sensor 232. Based on the rotation information, the controller 205 determines which portion or part of the device 100 was contacted/impacted at the end of the free-fall to accurately ascertain any possible damage to the device 100. In some embodiments, the controller 205 takes additional actions based on determining which part of the device 100 is impacted. For example, when the controller 205 determines that a battery pack is impacted during the fall, the controller 205 may alert the user, for example, on the device 100 or on a connected smartphone app that the battery needs to be inspected. Additionally, the controller 205 may prevent operation of the device 100 until the controller 205 receives an indication (for example, a user input, an input from the battery pack, etc.) that the battery pack has been inspected.

Figure 8:
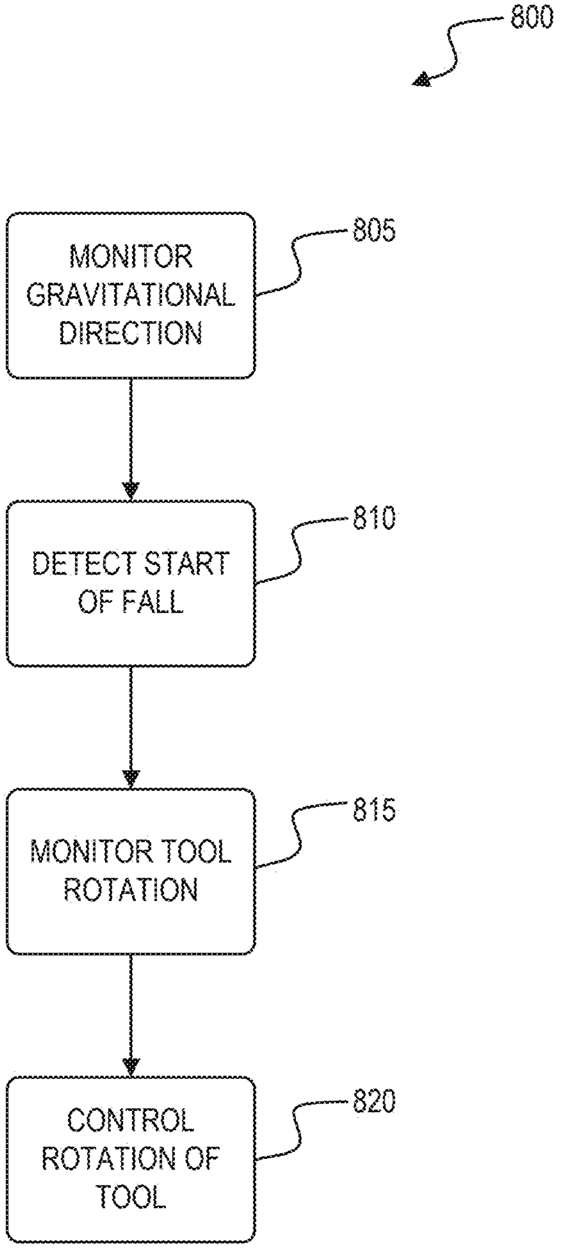
FIG. 8 illustrates a process for controlling a rotation of a device.

In some embodiments, the motion sensor 615 detects a fall, and then controls the motor 210 to orientate the device 100 to minimize the severity of contact upon landing. FIG. 8 illustrates a method 800 for controlling an orientation of the device 100 when falling. The device 100 monitors a gravitational direction (STEP 805). The device 100 then detects the start of a fall (STEP 810). The start of a fall may be characterized by a plurality of different factors (e.g., acceleration values from, for example, the motion sensor 615). The controller 205 monitors the device 100's rotation during the fall (STEP 815). The controller 205 then controls the rotation of the device 100 (STEP 820). Through controlling the rotation of the device 100, the orientation of the device 100 (with respect to a below surface) can be controlled to mitigate the severity of damage that may occur as a consequence to a fall. The control can include, for example, braking a motor, decoupling an output, powering a motor to spin (for example, in an opposite direction), reducing power, etc. In some embodiments, the controller 205 monitors the inertia of the device 100 and potential attachments. In other embodiments, the controller 205 monitors the angular momentum of the device 100.

In some embodiments, a height of the device 100 is estimated prior to the fall. The controller 205 may optimize a device 100's landing on a surface within a characteristic fall range (e.g., a fall from 3-9 feet.). The controller 205 may try and minimize the body rotation of the device 100, especially when the device 100 reaches near a preferred orientation. For example, while using the device 100 to drill overhead, the method 800 includes monitoring a starting orientation of the device 100 and characteristics of the use of the device 100. In another example, when the device 100 is hung from a tool belt, the device 100 monitors the waist height of where the tool belt is located. In another example, while climbing a ladder, the device 100 monitors a climbing motion. This is accomplished through an advanced controller, a barometer, or another component. In another example, when the device 100 is thrown, the motion of throwing is monitored (e.g., using slow steady acceleration). In another example, while traveling in a vehicle, the controller 205 monitors movement of the device 100 (e.g., using a global positioning system (GPS) sensor located within the device 100). In some embodiments, the controller 205 monitors a 3-Dimensional position of the device 100 (e.g., known for a precision power tool via total layout stations or other layout stations). In some embodiments, the device 100 utilizes an external cushion (e.g., an airbag, a parachute, etc.) to lessen or absorb an impact on the device 100 when dropped.

In some embodiments, the device 100 contains hydraulics (e.g., a hydraulic pump, a crimper, a cutter, etc.). The device 100 can open a release valve to decrease pressure within internal components of the device 100. This decreases the likelihood of hydraulics escaping a component's enclosure which risks cracking. Additionally, when a piston is mechanically limited from moving (e.g., jaws shut, electronic lock, etc.), the device 100 could increase the pressure within internal components to prevent cracking or denting from occurring, avoiding possible leaking, etc. This is particularly advantageous for a tool that includes a secondary enclosure that could avoid a leak.

In some embodiments, the device 100 is a linearly actuated saw (e.g., a reciprocating saw, a jig saw, etc.) with a saw attachment. The device 100 can power and/or brake the motor 210 accordingly, such that the device 100 comes to rest with the saw attachment's blade at the least exposed position.

In some embodiments, the device 100 is a tool with a depth adjustment (e.g., a router, a circulating saw, etc.). When a fall is detected, the controller 205 acts to minimize the exposed depth, minimizing damage to the device 100 and any extending attachments.

In some embodiments, the device 100 is a tool with a guard (e.g., a circulating saw). The device 100 monitors a location of the guard during a fall. The device 100 then either releases the guard from the body of the device 100 (e.g., when the guard was being held open) or is powered to close (e.g., to protect a blade). This prevents any unnecessary damage from occurring to the device 100.

In some embodiments, the device 100 is a tool with a powered elevation (e.g., an adjustable tower light, etc.). The device 100 detects a tipping or falling movement, then an attached light is retracted to a lower height to prevent damage to the device 100.

In some embodiments, the device 100 is a handheld tool (e.g., a drill, a screwdriver, a ratchet, etc.). The device 100 minimizes force and potential damage to the device 100 or a user, by disengaging a drive train. In some embodiments, the device 100 employs a lower clutch setting or shifting to a different gear. In some embodiments, the device 100 can employ field weakening to the motor 210 such that the cogging nature of a motor 210 is mitigated to reduce inertia. In yet another embodiment, the device 100 can employ a powering of the motor 210 based on suspected loading on an end effector such that an inertia of the motor 210 or other components can be effectively reduced.

In some embodiments, the device 100 is a power tool with a motor 210. During a suspected fall, the device 100 may create a vibration sound by providing electrical pulses to the motor 210. These emitted sounds may be perceivable to a user's ear or detectable by a different monitoring device. Additionally, the emitted sounds may have a characteristically negative sound (e.g., a whining tone, etc.).

In some embodiments, the device 100 is a power tool with a visual element (e.g., a light). During a suspected fall, a light or display may be employed to flash, turn on, pulse, or lock on for an extended duration. If, for example, the device 100 is dropped in the dark, the illumination allows for the device 100 to be easily found.

In some embodiments, the device 100 is a power tool device or radio with audio production capabilities. When the device 100 is falling, the device 100 is configured to produce an audible alert to a user (e.g., beeping, bussing, etc.).

In some embodiments, the device 100 is a power tool with self-destructing means. Upon a detection of a significant fall height, the device 100 employs a self-destruction system (e.g., purposely breaking, increasing sensitivity of a fuse via heating, or electronically opening a breaker component). This feature may be useful in Lithium-ion batteries to prevent the fall from impacting active Lithium-ion cells.

Figure 9:
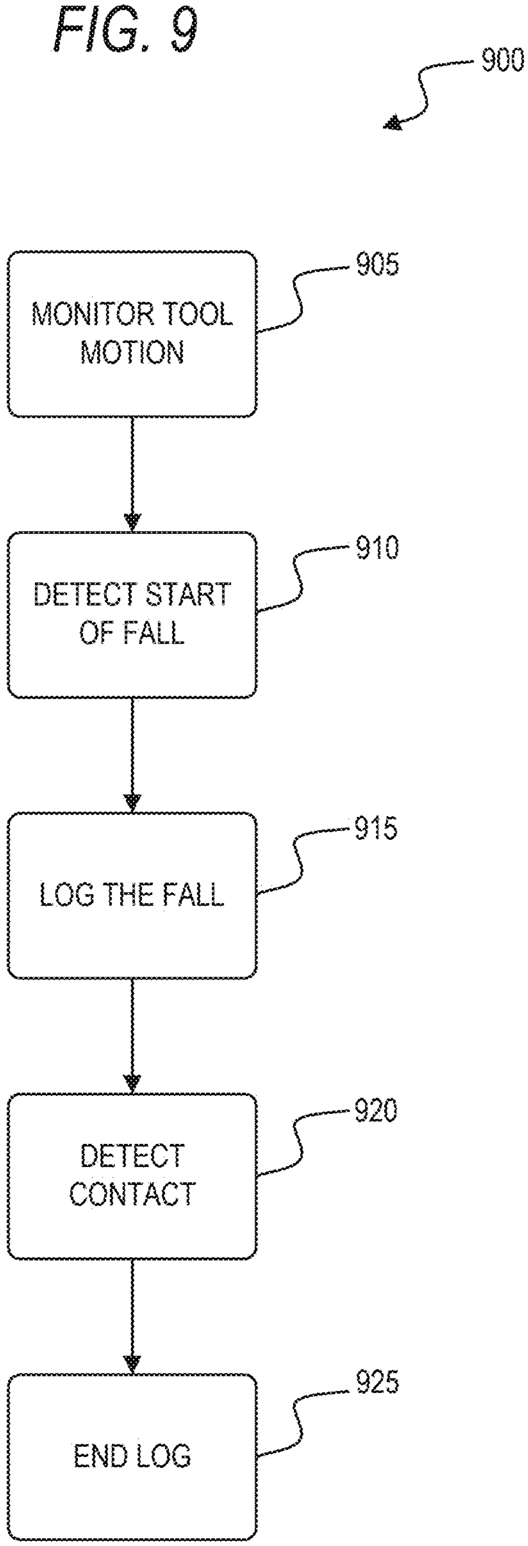
FIG. 9 illustrates a process for logging device fall data.

In some embodiments, data associated with the drop of the device 100 is logged over the course of the fall. FIG. 9 illustrates a method 900 for logging fall data for the device 100. The device 100's motion is monitored (STEP 905). The controller 205 may detect the start of a fall (as described above) (STEP 910). Prior to the fall, an optional buffering system within the device 100 may store motion data. Once the start of the fall is detected, a system of the device 100 begins to log the fall (STEP 915). The system of the device 100 continues to log characteristics of the fall until contact with a surface is detected (STEP 920). Once contact is detected (or, in some cases, the motion of the device 100 ceases), the system of the device 100 ends the log (STEP 925). Logging the fall of the device 100 provides for hindsight analysis. The later analysis may use raw fall data to ascertain broken components, access warranty, assessing insurance claims, and other reasons.

In some embodiments, the device 100 sends a wireless message containing fall information during the extent of a fall. During a fall, the device 100 may become damaged, out of calibration, or pose a serious risk (e.g., a battery short, pinched wires, etc.). The device 100 may send at least one emergency message during or after the fall. The emergency message may be a wireless message (e.g., via Bluetooth, WiFi, cellular, etc.). The emergency message contains a plurality of information, such as identifying information regarding the device 100, and/or fall information regarding all the characteristics of the fall itself (e.g., height of drop). Multiple emergency messages may also be sent.

In the event of a serious fall which results in the system of the device 100 not being capable of logging after the device 100 has fallen, in some embodiments, the device 100 includes a plurality of permanent features that allow the device 100 to indicate that a fall event has occurred. In one embodiment, a register entry of the device 100 is set to a particular value. In other embodiments, a specific capacitor is charged or an e-ink display is set.

The logged information of a fall has several uses, such as warranty eligibility, insurance, auto-ordering of replacements, recalibration needs, alerts and notifications, and reports and analytics for other stakeholders. An application or an online dashboard may display analytics (e.g., a histogram) of characteristics of a fall, such as fall heights, fall severities, when a fall occurs, suspected throws, etc.

After a fall of the device 100, the device 100 may execute a self-calibration procedure. In some embodiments, the self-calibration procedure may include measuring impedances, capacitances, inductances, or other electronic signatures of core circuitry. The device 100 may have prerecorded typical electronic signatures stored to analyze any future readings accurately. Electronic signatures may scale with temperature, and these electronic signatures can be temperature compensated (e.g., from a thermocouple, thermistor, or thermal model). Additionally, the device 100 samples an electronic signature of a component during a fall and after the device 100 itself comes to a rest. For example, a device 100 might do a first electronic signature inspection after a fall of 1 foot. As most drops exceed 1 foot, running such operation poses minimal risk. After the device 100 comes to a rest, the device 100 reinspects to survey any characteristic differences. The device 100 may conduct multiple checks. When a first check suggests an issue (or an attachment suggests an issue), the other check need not be executed.

A fall of the device 100 may cause mechanical damage. The device 100 may self-inspect to detect a nominal resistance in free spinning. The device 100 may use fall information, pre-fall characteristics, post-fall characteristics, and/or check information to identify potential damage and its characteristics. For example, the device 100 may identify a shaft that is shifted out of alignment, a binding that may have occurred, a leak (e.g., from hydraulics), a fan or propeller blade is broken or damaged, etc. Instructions on components that need to be checked can be provided to a user via an application, email, text messages, etc. (e.g., through a communications module and interface).

Additionally, the device 100 may require a data upload before continued use, ensuring fall events are reported. This feature may be controlled by an owner (e.g., a crib manager, etc.). The control may be set as a setting in an app or controllable via an online portal which can communicate with the device 100.

In some embodiments, a smart lanyard system would allow for fall detection transmission. The smart lanyard is in wireless or electrical communication with the device 100, where the smart lanyard can control an aspect of braking. When a device 100 detects a fall, the device 100 communicates electrically (e.g., wirelessly) to a smart lanyard system which activates a proactive protective response. In one embodiment, the smart lanyard has an electronically controlled adjustable brake that allows a lanyard's tethered response to be adjustable (for example, via a reeled cord extension with a brake). Alternatively, when the lanyard system is built into and controllable by the device 100, the device 100 may directly enable a proactive protective response to quickly slow a fall. In some embodiments, parachutes may be employed as part of a smart lanyard.

In some embodiments, the device 100 indicates a potential fall of a user, particularly when the device 100 is held prior to or during the fall. The device 100 directly triggers a binary heightened likelihood of the user's fall. In some embodiments, a more advanced drop detection is utilized using the machine learning controller. The advanced drop detection is able to further detect the user fall based on the motion of the device 100. The controller 205 detects characteristics of the device 100 to determine a state of the device 100 (e.g., being held, being stored, falling, trigger releasing, being released, etc.). The device 100 can wirelessly communicate to a fall prevention system that initiates a protective response from the device 100. For example, the fall prevention system can be a human tethering system. Additionally, the device 100 wirelessly communicates an alert (i.e., text message, dashboard alert, alarm system, etc.) using a communication module and interface.

Figure 10:
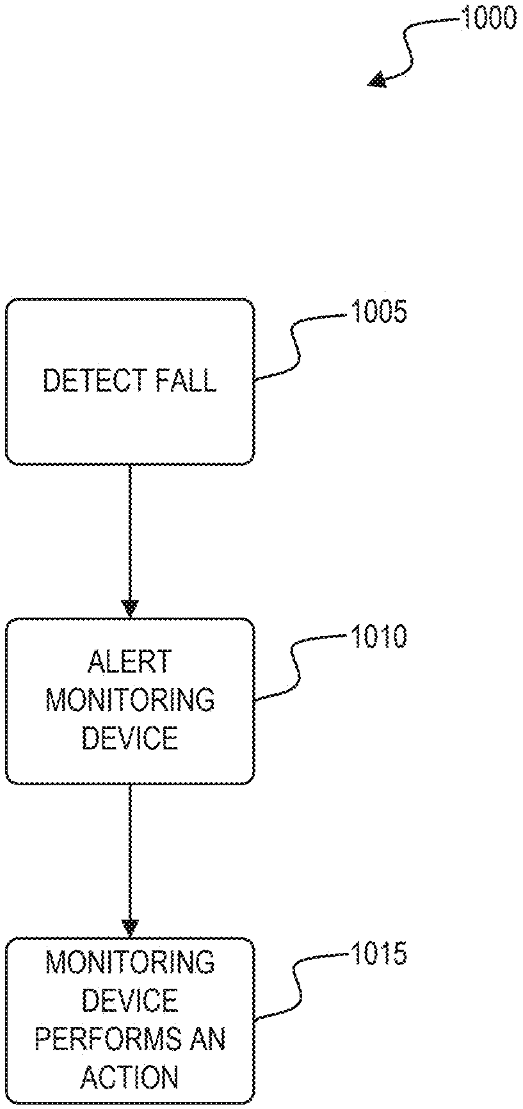
FIG. 10 illustrates a process for alerting a monitoring device of a fall.

FIG. 10 illustrates a method 1000 for communicating with a monitoring device. The method 1000 includes identifying safety hazards and safety risks and communicate these hazards and risks to a user or device. The device 100 detects a fall (STEP 1005). The device 100 alerts a monitoring device (STEP 1010). In some embodiments, the monitoring device is an audio device. In other embodiments, the monitoring device is a camera or smart phone. Due to the fall of the device 100, the monitoring device acts upon the alert from the device 100 (STEP 1015). The monitoring device may monitor the device 100, change a monitoring rate (e.g., resolution, video frame-rate, audio bandwidth, compression), flag a time-stamp, display a particular camera feed on a display, change an analysis threshold for protective actions, trigger a request for help, or another action that can be taken by the monitoring device.

Figure 11:
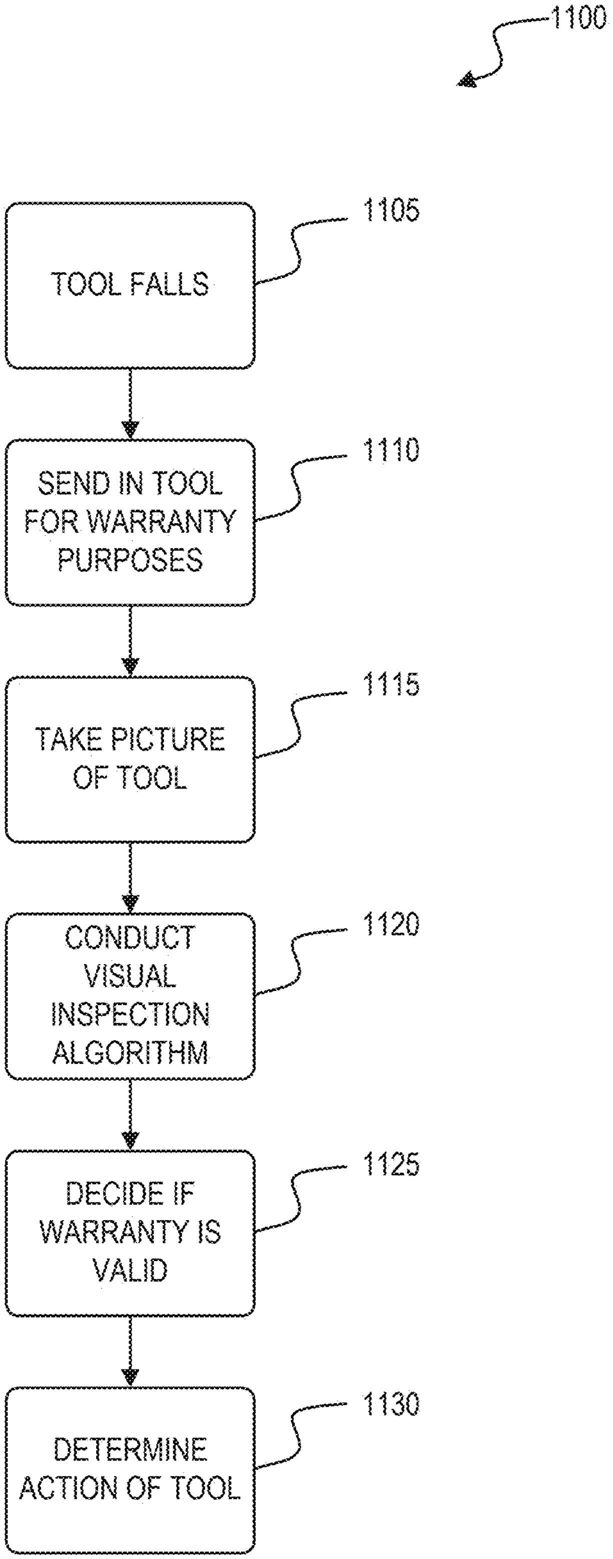
FIG. 11 illustrates a process for evaluating a device warranty after a fall.

In some embodiments, a fall of the device 100 is monitored through employing use of a deformable exterior component. For example, this may include crushable and breakable ribs, posts, tabs, beams, vent guards, crushable structures, structures that pop, dent, crack, or otherwise leave a visible change, materials of multiple colors that are exposed upon impact, and other parts of a housing of the device 100. After the device 100 falls, it may be eligible for a warranty. FIG. 11 illustrates a method 1100 that includes detecting when the device 100 falls (STEP 1105). If the device 100 is deformed, the device 100 is sent in for warranty purposes (STEP 1110). In some embodiments, a user takes a picture of the device 100 and submits the picture to check if a warranty will be honored without having to send the actual device 100 in to a service center. A picture is then taken of the device 100 (STEP 1115). A visual change from a normal state of the device 100 and deformed components can be inspected by a visual algorithm. In some embodiments, the visual algorithm is a machine learning visual algorithm. The visual algorithm assesses a degree of damage of the device 100 (STEP 1120). Additionally, visual detection is a benefit to crib managers of devices that want to understand and/or track damage to the plurality of devices. For example, a small amount of damage may not invalidate a warranty, but the characteristics of the damage may be of interest to the crib manager. Additionally, capacitance or another electrical characteristic can be measured of a thin capacitive covering (e.g., the housing). The visual algorithm may then decide whether the warranty is either invalid or valid (STEP 1125). Additionally, the device 100 may then be disabled, locked, reenabled, etc., to either authorize use to continue or to disallow any use due to the results of the visual algorithm (STEP 1130) and what is optimal for the device 100. In some embodiments, known factors (e.g., grip sensing), modifies thresholds, other algorithm parameters, or even algorithm selection. For example, when a device 100 detects a user's grip, the device's trajectory during a fall may be different. In some embodiments, a user can customize the behavior with the device 100 related to drop detection via settings. For example, a connected application may program a device 100 to be more or less sensitive to drop detection. Additionally, alerts can be enabled (e.g., whom to notify based on the parameters of the drop detection, etc.).

In some embodiments, a suspected free fall event (e.g., detected via an interrupt as determined from a motion sensor) triggers changing a sample rate, resolution, filtering, or other characteristics of the motion sensor. In some embodiments, the plurality of sensors are present in a connected battery pack, battery pack adapter, an insertable module (inserted within a power tool, battery pack adapter, or a battery pack), or a wrist watch. In some embodiments, the processing for free fall detection also happens on a power tool device, or a remote device in communication with the device 100. In some embodiments, shutdown, logging, relation actions happen on a plurality of connected power tool devices.

Thus, embodiments described herein provide, among other things, systems and methods for detecting free-fall in a device. Various features and advantages are set forth in the following claims.

What is claimed is:

1. A power tool comprising:
a motor configured to produce an output;
a sensor configured to measure an acceleration of the power tool and generate an output signal related to the acceleration of a power tool; and
a controller electrically connected to the motor and the sensor, the controller configured to:
receive the output signal related to the acceleration of the power tool,
compare the acceleration of the power tool to a free-fall acceleration threshold,
detect a free-fall condition of the power tool based on the comparison of the acceleration of the power tool to the free-fall acceleration threshold,
monitor a rotation of the power tool using the sensor in response to detecting the free-fall condition,
control the motor to alter the rotation of the power tool during the free-fall condition, and
perform an operation separate from the control of the motor, wherein the controller is configured to perform the operation by closing a guard of the power tool.

2. The power tool of claim 1, wherein the controller is further configured to monitor an inertia of the power tool.

3. The power tool of claim 1, wherein the controller is further configured to monitor an angular momentum of the power tool.

4. The power tool of claim 1, wherein, to alter the rotation of the power tool, the controller is configured to perform at least one selected from a group consisting of: brake the motor, decouple an output, power the motor to spin, and reduce power to the motor.

5. The power tool of claim 1, wherein the controller is further configured to minimize the rotation of the power tool when the power tool reaches a preferred orientation.

6. The power tool of claim 1, wherein the controller is further configured to orient the power tool to minimize damage to the power tool after the free-fall condition.

7. A method for drop detection of a power tool, the method comprising:
generating, using a sensor, an output signal related to an acceleration of the power tool;
receiving, using a controller, the output signal related to the acceleration of the power tool;
comparing, using the controller, the acceleration of the power tool to a free-fall acceleration threshold;
detecting a free-fall condition of the power tool based on the comparison of the acceleration of the power tool to the free-fall acceleration threshold;
monitoring, using the sensor, a rotation of the power tool in response to detecting the free-fall condition;
controlling a motor to alter the rotation of the power tool during the free-fall condition; and
performing an operation separate from controlling the motor, wherein the controller is configured to perform the operation by closing a guard of the power tool.

8. The method of claim 7, further comprising:
monitoring an inertia of the power tool.

9. The method of claim 7, further comprising:
monitoring an angular momentum of the power tool.

10. A power tool comprising:
a motor configured to produce an output;
a sensor configured to measure an acceleration of the power tool and generate an output signal related to an acceleration of a power tool; and
a controller electrically connected to the motor and the sensor, the controller configured to:
detect a free-fall condition of the power tool based on the acceleration of the power tool,
sample an electronic signature of a component after the free-fall condition has ended,
compare the electronic signature of the component to a prerecorded electronic signature for the component,
determine that the component has been damaged based on the comparison of the electronic signature of the component to the prerecorded electronic signature for the component,
provide an indication to a user that the component has been damaged, and
provide a user with an instruction on the component that has been damaged,
wherein the instruction is provided to the user in an application.

11. The power tool of claim 10, wherein the electronic signature of the component is configured to be compensated for temperature.

12. The power tool of claim 10, wherein, to sample the electronic signature of the component, the controller is configured to measure at least one of an impedance, a capacitance, or an inductance of the component.

13. The power tool of claim 10, wherein the controller is further configured to conduct a plurality of checks to determine an issue with the component.

14. The power tool of claim 10, wherein the controller is further configured to:
perform a self-inspection of the power tool,
wherein the self-inspection includes using at least one of fall information, a pre-fall characteristic of the power tool, or a post-fall characteristic of the power tool to detect a nominal resistance in free spinning of the motor.

15. The power tool of claim 10, wherein the controller is further configured to:

provide a user with an instruction on the component that has been damaged, wherein the instruction is provided to the user in an email.

16. The power tool of claim 10, wherein the controller is further configured to:

provide a user with an instruction on the component that has been damaged, wherein the instruction is provided to the user in a text message.

17. The power tool of claim 10, wherein a data upload is required prior to continued use of the power tool after the free-fall condition has ended.

* * * * *